Patented Nov. 1, 1932

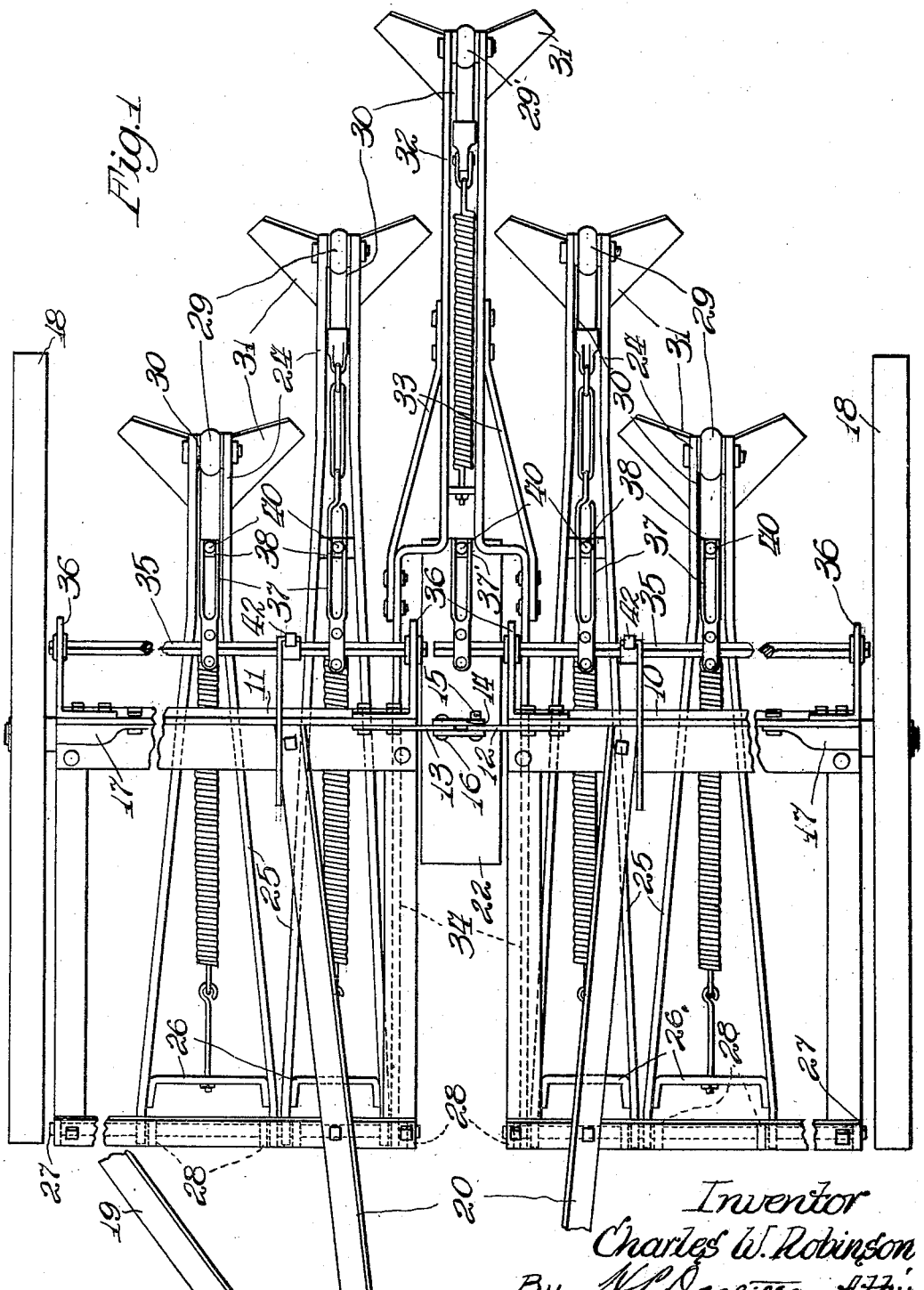

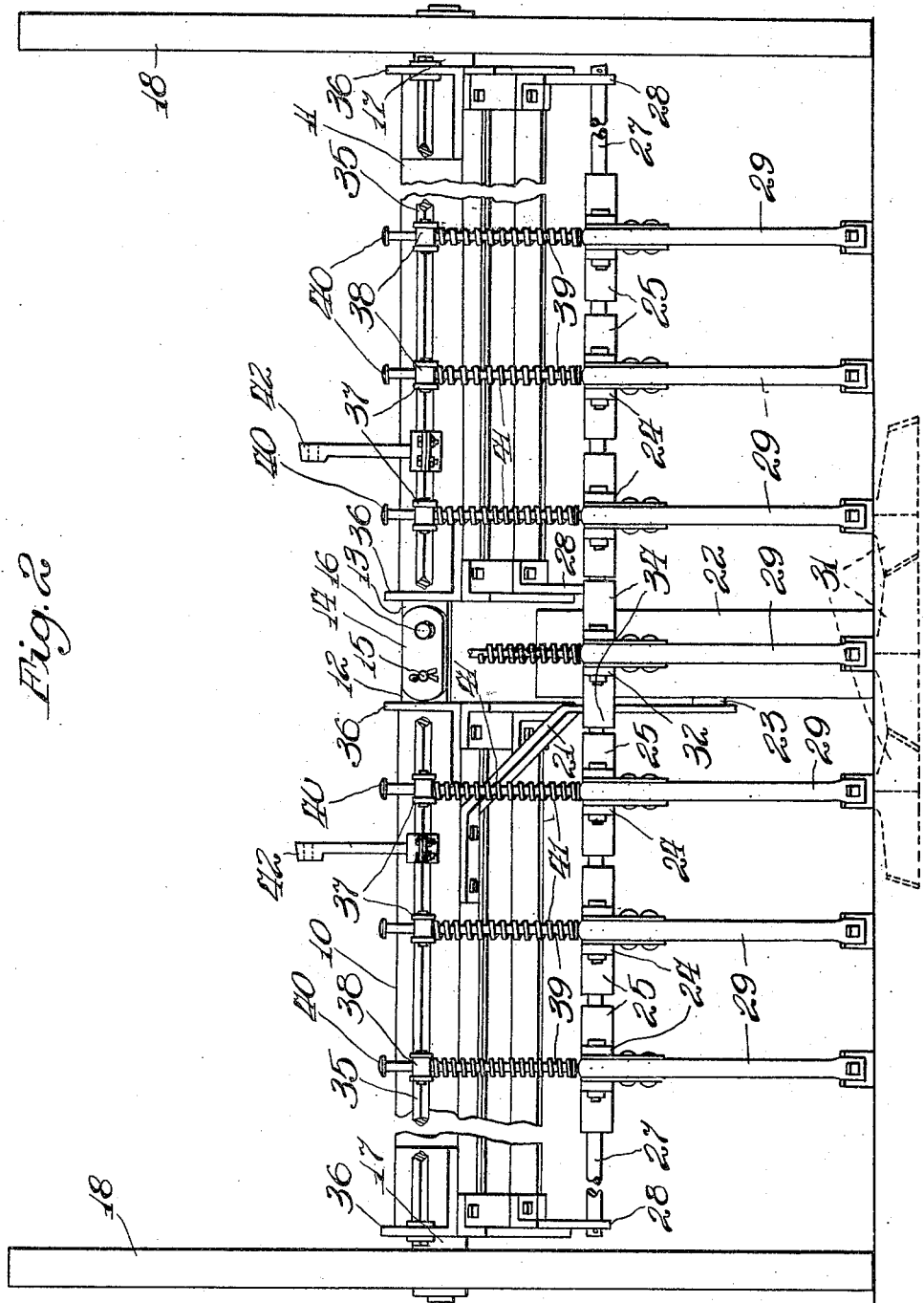

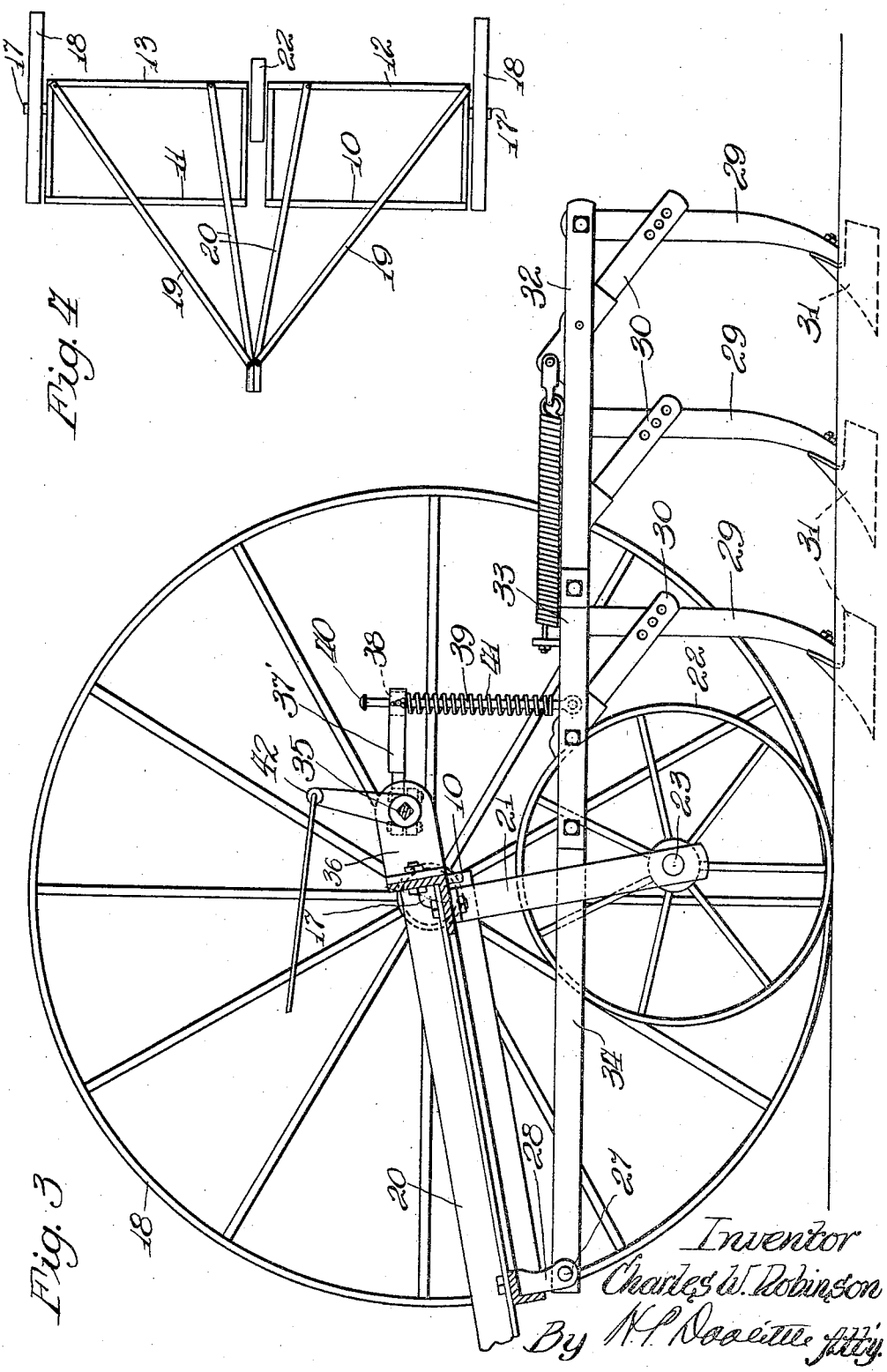

1,886,229

UNITED STATES PATENT OFFICE

CHARLES W. ROBINSON, OF HAMILTON, ONTARIO, CANADA, ASSIGNOR, BY MESNE ASSIGNMENTS, TO INTERNATIONAL HARVESTER COMPANY, OF CHICAGO, ILLINOIS, A CORPORATION OF NEW JERSEY

FIELD CULTIVATOR

Application filed September 24, 1931. Serial No. 564,796.

This invention relates to a field cultivator. More specifically it relates to a multiple unit or duplex type of cultivator.

In the construction of field implements for working over wide areas, it has often been found necessary or desirable, in order to obtain the necessary flexibility to provide a plurality of units flexibly connected together end to end.

The principal object of this invention is to provide a field cultivator constructed as a duplex implement embodying a novel hinge and center support construction. Another object is to so connect the individual sections that even spacing and operation of the cultivating shovels can be obtained. Another object is to provide a shovel for working the soil in the space between the sections and removing the center supporting wheel mark and to provide means for simultaneously lifting and lowering said shovel with the remainder of the shovels.

In the drawings:

Figure 1 is a plan view of a cultivator construction embodying the invention; a portion of the cultivator construction being broken away in order to show the device on a larger scale;

Figure 2 is a rear view of the device shown in Figure 1; the shovels being shown in operative position below the ground level, indicated by dotted lines;

Figure 3 is an end view partly in section showing the center support and the central cultivating unit of the device shown in Figures 1 and 2; and Figure 4 is a diagrammatic drawing on a small scale, showing the relative positions of the elements making up the invention and the connections constituting the draft means.

Two frame sections 10 and 11, made up of angle bars connected together in substantially rectangular form, are hinged together side by side at the rear of the sections. A bar 12, rigidly connected to one of the angle bars constituting the frame 10, extends inwardly toward the adjacent frame 11. A similar bar 13, rigidly connected to one of the angle bars constituting the frame 11, extends inwardly toward the frame 10 in alignment with the bar 12. Two spaced links 14 are pivotally connected to the ends of the bars 12 and 13 by pins 15 and 16. The pin 15 is riveted in position. The pin 16 is held in position by a key, whereby it may be removed to provide for taking the frame sections apart. As best shown in Figure 1, stub axles 17 are rigidly secured to the rear angle bars of the frames 10 and 11 and extend outwardly therefrom. Wheels 18 are mounted on the axles 17. A diagonally extending bar 19, attached to each of the sections 10 and 11 at the rear outer corners thereof, extends inwardly forwardly to provide draft means. The bars 19 are rigidly secured to the frame sections. A second set of bars 20, connected to the frame sections near their adjacent ends, extend forwardly inwardly and are connected together.

The bars 19 are secured to the bars 20. The connections of said bars are sufficiently loose and flexible to permit the hinging of the two frame sections with respect to each other. A member 21, rigidly secured to the frame section 10, near the inner end thereof, extends inwardly and downwardly to form a support for the center wheel 22. Said wheel is rotatably mounted on a stub axle 23 secured to the member 21. The wheel 22 is positioned directly under the links 14, forming the hinge between the two frame sections. The links 14, being pivotally connected at each end, provide for floating up and down movement of the frame 11 with respect to the frame 10. A plurality of cultivating beams 24, built up as frames, including forwardly diverging side bars 25 and a forward cross member 26, are pivotally connected at their forward ends to the forward portions of the frame sections 10 and 11. The side members 25 are provided with aligned apertures at their forward ends through which a rod 27 passes. Said rod also passes through a plurality of apertured attaching members 28, rigidly secured to the angle bars constituting the forward members of the frame sections 10 and 11. Shanks or standards 29 are secured to the beams 24 by tripping mechanisms 30. Said mechanisms are constructed to allow the shanks 29 to swing rearwardly when an obstruction is encountered. As such mechanisms are well known in the art and do not constitute a part of this invention, their construction is not shown in detail. The alternate beams 24 are of different lengths with alternate shanks lying in spaced transverse lines. Sweeps or shovels 31 are connected to the shanks 29. Said shovels are of a lateral width greater than the distance between the adjacent beams 24. The desirability of using a shovel construction of this type is the reason for constructing the beams of different lengths. The cultivator beams extend in equally spaced relation from end to end of the sections 10 and 11. The adjacent beams at the hinged ends of the sections are longer with the shovels operating in the rear transverse line. This construction provides space for the center wheel 22, which is positioned vertically with its axis slightly to the rear of the rearmost portions of the frame sections.

To provide for cultivating the space between the two adjacent shovels at the center of the frame sections and to remove the center wheel mark, a center beam 32 is provided. Said beam is substantially longer than the longer of the beams 24. The shank 29' on the beam 32 is positioned rearwardly of the shanks 29 in the rear row the same distance that said shanks are positioned rearwardly of the shanks in the front row. The beam 32 is in the form of a frame having forwardly diverging side bars 33 connected to forwardly extending parallel bars 34. The bars 34 are bent inwardly intermediate their ends and extend rearwardly to form the support for the shank 29' and the tripping mechanism 30 of the rear shovel. The forward ends of the bars 34 are pivotally connected by the rod 27 in transverse alignment with the connections of the beams 24. As shown in Figure 1, the bars 34 extend on opposite sides of the center wheel 22 and are connected respectively to the frames 10 and 11. The flexibility of the connection and of the bars 34 permit normal hinging of the frame sections without unduly distorting the frame making up the beam 32.

To provide for lifting the shovels out of operative position and for maintaining them in working position, a rock shaft 35 is mounted on each frame section in brackets 36 rigidly secured to the frame sections. Rearwardly extending lever arms 37 secured to the rock shaft, pivotally engage members 38, the members 38 having vertical bore therethrough in which substantially vertical rods 39 extend. Each of the rods 39 is pivotally connected to one of the beams 24 at one end and is provided with a stop 40 at the other end. A compression spring 41 is mounted on each of the rods 39. Said springs provide for resiliently holding the cultivator beams downwardly and permitting upward deflection when obstructions are encountered. The stops 40 engage the members 38 to regulate the depth at which the shovels 31 may operate. Said stop also provides for lifting the cultivator beams when the rock shaft 35 is rotated with the lever arms 37 moving in an upward direction. Actuating levers 42 are secured to the rock shaft 35 for rotating the same.

As shown in Figure 1, the rock shaft 35 on the frame section 10 extends inwardly over the center wheel. A lever arm 37', exactly similar to the lever arms 37, is positioned to lift the center beam 32 simultaneously with the beams 24.

The operation of the cultivator above described will be obvious from the detailed description. The cultivator beams are all simultaneously lowered into working position. As the shovels 31 of the front and rear rows are in overlapping position, there are no gaps in the soil being traversed. Likewise the rear shovel on the beam 32 covers the space which would otherwise be left between the adjacent shovels on the two hinged sections. By positioning the center wheel between the two adjacent shovels, the rear extra shovel operates directly under the path of the wheel, whereby the soil is thoroughly loosened, preventing any packing which might otherwise be the result of the substantial weight of the duplex cultivator.

It is to be understood that applicant has shown and illustrated only a preferred embodiment of his improved duplex cultivator construction and that he claims as his invention all modifications falling within the scope of the appended claims.

What is claimed is:

1. A field implement comprising two frame sections, a hinge connecting said sections together side by side, supporting wheels mounted at the outer sides of said sections, a center wheel mounted directly under the hinge between the sections, draft means attached to said sections, a plurality of spaced soil working elements mounted on each section, and a center element connected to one section and positioned directly behind the center wheel.

2. A field implement comprising two frame sections, a hinge connecting said sections together side by side, supporting wheels mounted at the outer sides of said sections, a center wheel mounted directly under the hinge between the sections, draft means attached to said sections, a plurality of spaced soil working elements pivotally connected to each section on transverse axes, and a center element pivotally connected to one section and positioned directly behind the center wheel.

3. A field implement comprising two frame sections, a hinge connecting said sections together side by side, supporting wheels mounted at the outer sides of said sections, a center wheel mounted directly under the hinge between the sections, draft means attached to said sections, a plurality of spaced soil working elements mounted on each section, said elements being equally spaced on each of the sections, the two adjacent elements at the hinged ends of the sections being spaced apart twice the distance of the other elements, and a center element connected to one section and positioned between said adjacent teeth.

4. A field implement comprising two frame sections, a hinge connecting said sections together side by side, supporting wheels mounted at the outer sides of said sections, a center wheel mounted directly under the hinge between the sections, draft means attached to said sections, a plurality of spaced soil working elements mounted on each section, and a center element connected to both sections adjacent the ends thereof and positioned directly behind the center wheel.

5. A field implement comprising two frame sections, a hinge connecting said sections together side by side, supporting wheels mounted at the outer sides of said sections, a center wheel mounted directly under the hinge between the sections, draft means attached to said sections, a plurality of spaced soil working elements pivotally connected to each section on transverse axes, and a center element pivotally connected to both sections adjacent the ends thereof and positioned directly behind the center wheel.

6. A field implement comprising two frame sections, a hinge connecting said sections together side by side, supporting wheels mounted at the outer sides of said sections, a center wheel mounted directly under the hinge between the sections, draft means attached to said sections, a plurality of spaced soil working elements pivotally connected to each section on transverse axes, a center tool frame having side members extending on opposite sides of the center wheel, said members being pivotally connected to the frame sections adjacent the hinged sides and a soil working element carried by said frame.

7. A field implement comprising two frame sections, a hinge joining said sections together side by side, supporting wheels mounted at the outer sides of said sections, a center supporting wheel mounted directly under the hinge, a plurality of spaced implement beams pivotally connected on transverse axes to the frame sections, a center beam between the two beams adjacent the hinged sides of the frame sections, said center beam being directly behind the center wheel, and earth working elements mounted on said beams.

8. A field implement comprising two frame sections, a hinge joining said sections together side by side, supporting wheels mounted at the outer sides of said sections, a center supporting wheel mounted directly under the hinge, a plurality of spaced implement beams pivotally connected on transverse axes to the frame sections, said beams being alternately of different lengths and terminating in spaced transverse rows, the beams adjacent the hinged sides of the frame sections extending to the rear row, a center beam pivotally connected to one of the frame sections and extending between said adjacent beams, said center beam being of a length greater than said beams, and earth working elements mounted on all of said beams.

9. A field implement comprising two frame sections, a hinge joining said sections together side by side, supporting wheels mounted at the outer sides of said sections, a center supporting wheel mounted directly under the hinge, a plurality of spaced implement beams pivotally connected on transverse axes to the frame sections, said beams being alternately of different lengths and terminating in spaced transverse rows, the beams adjacent the hinged sides of the frame sections extending to the rear row, a center beam pivotally connected to one of the frame sections and extending between said adjacent beams, said center beam being of a length greater than said beams, and shovels mounted on all of said beams, said shovels being wider than the distance between two adjacent beams.

10. A field implement comprising two frame sections pivotally connected together side by side, supporting wheels mounted at the outer sides of said sections, a center supporting wheel mounted adjacent the pivot axis of said sections, draft means attached to the sections, a plurality of spaced soil working elements mounted on each section, and a center element connected to the implement and positioned substantially behind the pivot axis.

11. A field implement comprising two frame sections, a hinge connecting said sections together side by side, supporting wheels mounted at the outer sides of said sections, a center supporting wheel mounted adjacent the hinge between the sections, draft means attached to said sections, a plurality of spaced soil working elements mounted on each section, and a center earth working element positioned substantially behind the hinge between the sections.

12. A field implement comprising two frame sections, a hinge connecting said sections together side by side, supporting wheels mounted at the outer sides of said sections, a center supporting wheel mounted adjacent the hinge between the sections, draft means attached to said sections, a plurality of spaced soil working elements mounted on each section, said elements being equally spaced on each of the sections, the two adjacent elements at the hinged sides of the sections being spaced apart twice the distance of the other elements, and a center element connected to the implement and positioned between said adjacent teeth.

13. A field implement comprising two frame sections, a hinge joining said sections together side by side, supporting wheels mounted at the outer sides of said sections, a center supporting wheel mounted adjacent the hinge, a plurality of spaced implement beams pivotally connected on transverse axes to the frame sections, said beams being laterally of different lengths and terminating in spaced transverse rows, the adjacent beams at the hinged sides of the frame sections extending to the rear row, a center beam pivotally connected to the implement and extending between said adjacent beams, said center beam extending rearwardly behind the rear row, and earth working elements mounted on all of said beams.

In testimony whereof I affix my signature.

CHARLES W. ROBINSON.